Feb. 8, 1955     A. R. NISBET, JR     2,701,435
COTTON PICKING MACHINE
Filed March 15, 1951     3 Sheets-Sheet 1
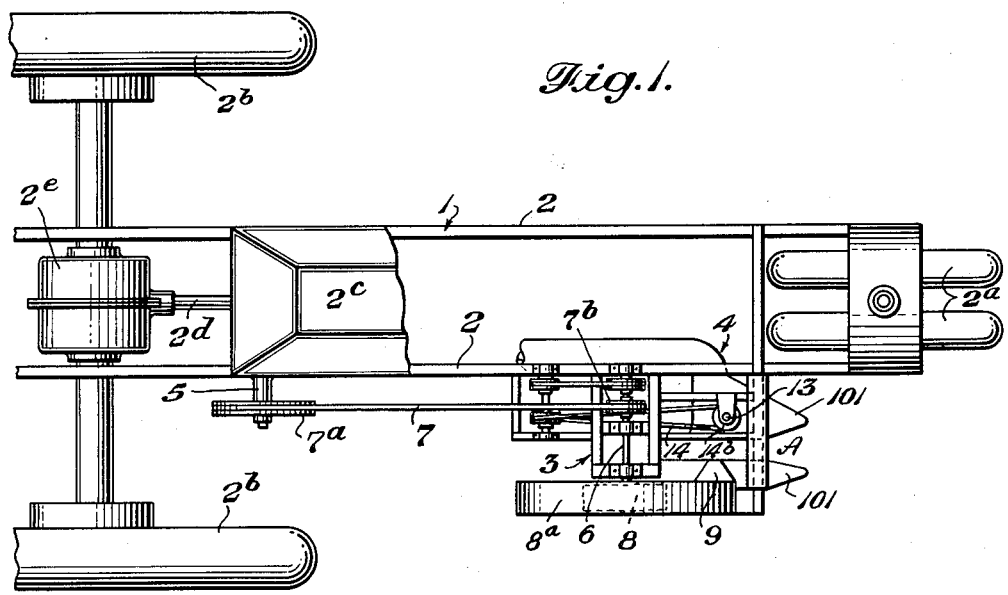
Fig. 1.
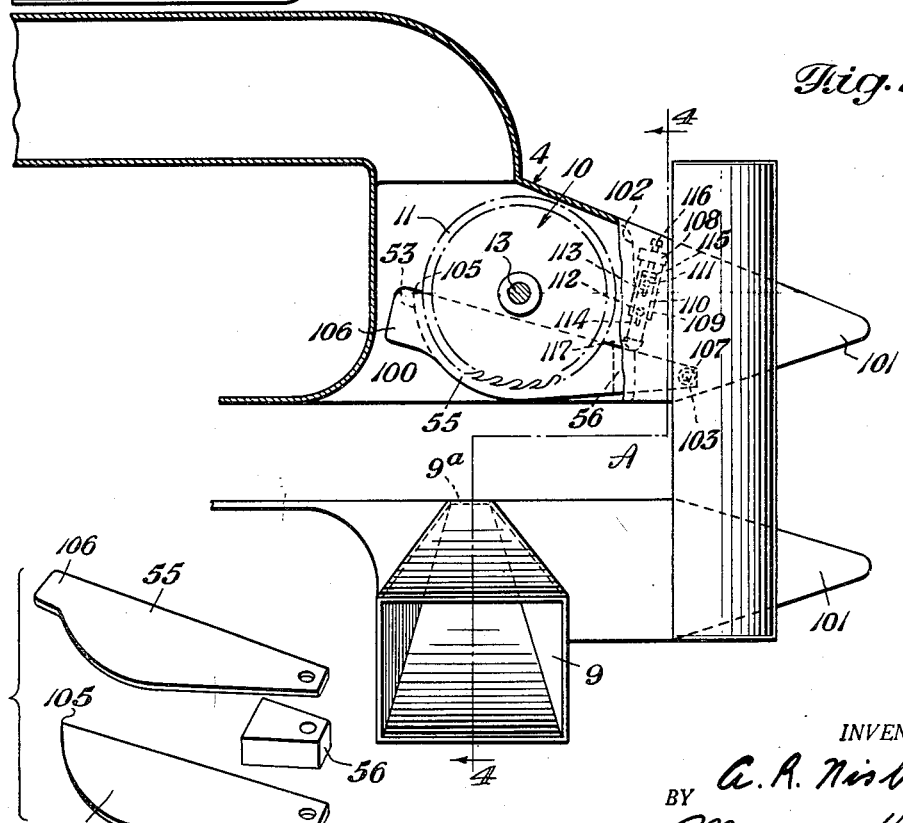
Fig. 2.
Fig. 5.
INVENTOR.
A. R. Nisbet Jr.
BY
Mumm Hare
ATTORNEY.

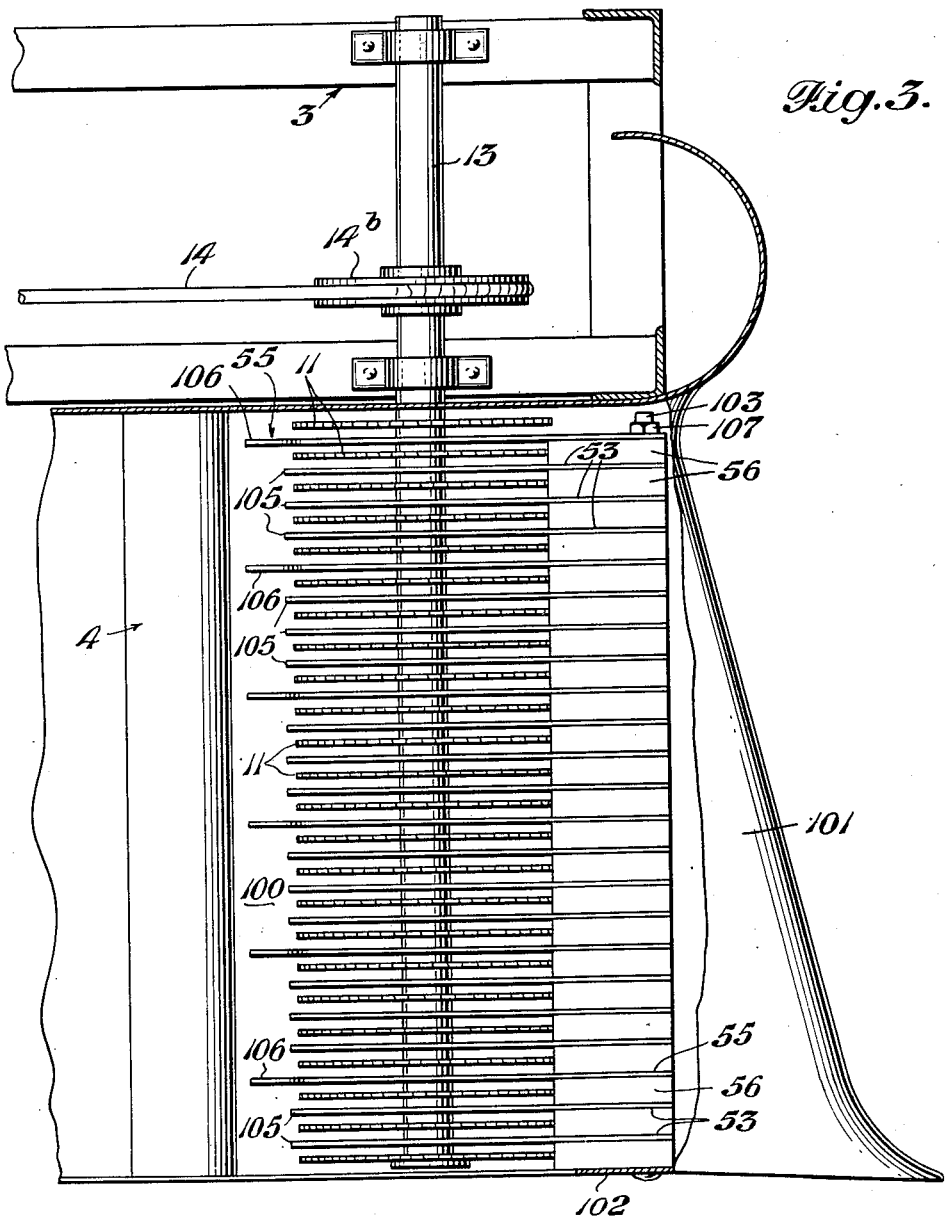

Feb. 8, 1955      A. R. NISBET, JR      2,701,435
COTTON PICKING MACHINE
Filed March 15, 1951      3 Sheets-Sheet 3
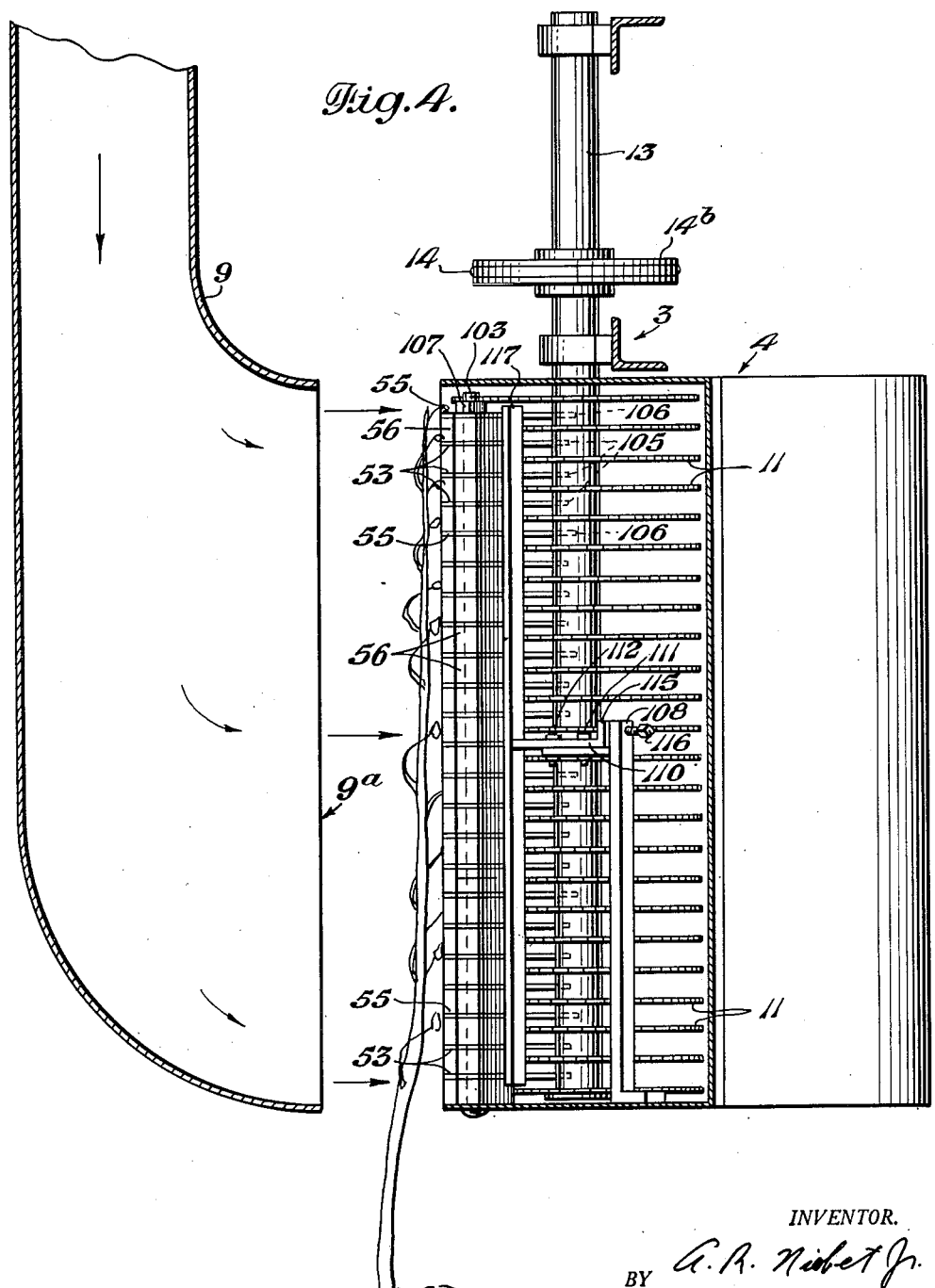

United States Patent Office 2,701,435
Patented Feb. 8, 1955

2,701,435

COTTON PICKING MACHINE

Alexander R. Nisbet, Jr., San Angelo, Tex.

Application March 15, 1951, Serial No. 215,763

3 Claims. (Cl. 56—12)

The invention relates to improvements in cotton picking machines, and more particularly to improvements in the picking unit of a machine of the general type disclosed in the patent to A. R. Nisbet, Sr., No. 2,484,524, dated October 11, 1949, wherein a rotary toothed picking unit comprising a plurality of spaced saws mounted for rotation on a vertical axis is carried on the frame of a moving vehicle, preferably equipped with a pair of forwardly projecting inclined plant guide members designed to guide cotton plants into a plant passageway extending lengthwise of the machine in the direction of movement thereof, the picker being located at one side of the plant passageway and a blower nozzle being located on the other side, whereby as the vehicle moves along a row of growing cotton the plants are guided into the passageway and as they pass between the picker unit and the blower nozzle outlet the bolls of cotton are forced against the saws of the picker unit, the lint is removed from the bolls by the rotation of the saws and is blown between the spaced saws into a fiber transfer passage leading to a suitable receiver or storage container carried by the vehicle. The picker unit is located at the inlet end of the transfer passage, which inlet intersects the plant passageway. In accordance with Patent No. 2,484,524 the saws of the picker unit are equipped with teeth curved in the direction of rotation of the picker unit, and in said patent the direction of rotation is such that those teeth which are effective in the picking operation, that is to say, the teeth which in a given stage of rotation of the picker unit are adjacent the plant passage, are moving forwardly in a direction opposite to the relative movement of the plants through the plant passage as the vehicle is advanced along a row of cotton. Also in accordance with the aforesaid patent, the individual saws of the picking unit are spaced from one another by suitable spacing members comprising smooth guard disks interposed between successive saws of the unit, said guard disks having diameters slightly greater than the diameters of the saws.

I have found that by reversing the direction of rotation of the saw units and also reversing the direction of the saw teeth, so that those teeth which are located adjacent the plant passage at a given stage of rotation of the unit are moving in the general direction of relative movement of the plants through the plant passage, certain advantages are attained as compared with the prior arrangement, and that additional advantages are attained when stationary guard members or fingers are employed in connection with the picker unit in place of the rotating guard members or disks disclosed in Patent No. 2,484,524, although the reversely rotating saws may be used with rotating guard disks instead of stationary guard fingers if desired without departing from my invention in its broadest aspects. The use of stationary guard members with rotating picker saws, broadly speaking, is not, however, my invention. Thus, it has been found in practice that with the former arrangement and operation of the picker unit the cotton plants, although partially protected by the guard disks, were nevertheless damaged to a certain extent by the saw teeth of the picker unit, when said teeth were rotating in a direction opposite to the direction of movement of the plants, but where the picking edge of each saw is moving in the same general direction as the relative movement of the cotton plants through the plant passage the damage to the plants is materially lessened.

Moreover, with the machine traveling and gathering cotton, the plant pushes and inclines forward quite a bit, and with the picker roll turning forward the inclination of the plant forward is aggravated, resulting in a very crowded condition of plants substantially at the point of picking, whereas with the picker roll turning rearwardly the motion of the picking unit tends to incline the plant upward and rearward, thereby producing a much more open plant situation at the point of picking. Furthermore, the plants and open bolls, etc., are not pulled over the picking unit under pressure as they are with the picking unit turning forward. The torture or damage to the plant with the picker roll turning rearward is considerably less than with the picker roll turning forward.

It will be understood that while reference is made herein to plants moving through the plant passage of the machine, actually the plants themselves remain stationary except as their tops are blown by the air blast, while it is the machine which moves forward during the relative rearward movement of the plants with reference to the picker unit and blower and other parts of the cotton picking machine, so that in referring to movement of the plants it is this relative movement which is actually intended.

The invention will be described with reference to a machine of the general type shown in Patent No. 2,484,524, but modified to include the reversely rotating saws and the stationary guard fingers.

In the drawings:

Fig. 1 is a fragmentary plan view with parts broken away showing the improved cotton picking mechanism mounted on a machine of the type shown in Patent No. 2,484,524;

Fig. 2 is a plan view on a larger scale than Fig. 1, with parts in section, showing the cotton picking mechanism;

Fig. 3 is an enlarged central longitudinal sectional view along a line of the plant passageway A in Fig. 2 looking in the direction of the picking assembly.

Fig. 4 is a section on line 4—4 of Fig. 2, with parts in elevation; and

Fig. 5 is an exploded view showing two of the guard fingers and a spacing member.

The cotton picker mechanism is shown applied to a tractor 1, a portion of which is indicated in outline only and needs but a brief explanation. The numeral 2 represents longitudinal bars constituting portions of the frame of the tractor; 3 a portion of the frame of the picker; and 4 casing parts which support and enclose portions of the picker. In the present construction, as also in Patent No. 2,484,524, the casing 4 is more in the nature of a supporting frame for the various parts of the picker than an enclosing housing, and it may be, and preferably is, open through a substantial portion of its bottom and front end to allow the air blast to flow freely therethrough and to permit trash and foreign material to pass from the picker, and in this respect the casing 4 differs from the fluidtight conduits required where suction as distinguished from an air blast is relied upon to bring the bolls into contact with the picking unit, to remove the lint therefrom, and to transfer the picked cotton to a container or receptacle.

The tractor may be one of a well known type having front supporting and steering wheels $2^a$, rear supporting and driving wheels $2^b$, a suitable body $2^c$ in which an internal combustion or other suitable motor may be enclosed, a propeller shaft $2^d$ driven by the motor, and a differential gearing $2^e$ through which the rear wheels are driven from the propeller shaft. 5 is a power take-off shaft suitably driven from the tractor motor, and 6 is a countershaft suitably driven therefrom, as by a belt 7 passing about pulleys $7^a$ and $7^b$, from which countershaft the operating parts of the picker are driven.

A blast fan 8 is mounted on and driven by the shaft 6 and the casing $8^a$ of this fan has a discharge duct or conduit 9 whose outlet end or nozzle $9^a$ faces toward and is arranged in spaced relation to a rotary picker device 10 for cooperation therewith as hereinafter described. In the travel of the machine along a cotton row the parts 9 and 10 are disposed on opposite sides of a plant passageway A and the blast from the fan strikes each plant and forces the same against the picker device.

As shown, the picker unit 10 comprises a plurality of spaced saws 11 secured in any suitable manner to a vertical shaft shown suspended from the framework above, the saws being rotatable with the shaft and spaced from one another by suitable spacing means. The shaft 13 may be rotated in any suitable manner, as, for example, by a belt 14 coacting with a pulley 14$^b$ secured to the shaft 13 above the saws, as more fully set forth in Patent No. 2,484,524. In accordance with the present invention the saw teeth are disposed in the opposite direction from those of the picker unit in Patent No. 2,484,524, and the direction of rotation of the saws is also opposite to that disclosed in said patent, thus preventing damage to the plant. As shown, the picker unit is mounted at the inlet of a cotton transfer passage 100 intersecting the plant passage A at one end. An air blast from the nozzle 9$^a$ located on the opposite side of the plant passage A from the picker unit 10 forces the plants within the passageway A against the picker unit. The rotating saws of the picker unit pull the lint from the bolls, and carry the same approximately 180°, at which point the air blast from the nozzle 9$^a$, having passed between the spaced saws, blows the lint from the teeth of the saws and conveys such lint through the transfer passage to a suitable container (not shown) at the other end of the transfer passage carried by the vehicle on which the picker unit is mounted.

It will be noted that at the forward end of the vehicle inclined guard members or plant gatherers 101 are provided to deflect the cotton plants into the plant passage A as the picker is moved along a row of growing cotton. Mounted on the fixed floor portion 102 of the cotton picker at a point in advance of the picker unit and toward the guide members or plant deflectors 101 is an upright rod or shaft 103 parallel to the shaft 13 carrying the picker saws. Upon the rod 103 is mounted a plurality of spaced elongated guard members or fingers designated 53 and 55 extending rearwardly from the supporting rod or shaft 103 and so positioned as to extend between successive saws 11 of the picker unit, successive guard fingers being separated from one another by means of suitable spacers 56 mounted on the vertical rod 103. Although the guard fingers are herein shown as interposed between each successive pair of saws it is apparent that by making the spacing units larger a smaller number of guard fingers may be employed extending only between certain of the saws of the group. The vertical spacing of the guard fingers is determined according to the size of the bolls, which may vary according to the variety of cotton being picked, and this spacing may be varied by introducing spacers of different thicknesses to correspond with the requirements of the particular crop being picked.

As shown, the guard fingers 53 and 55 are of different shapes and lengths, the guard fingers 55 being longer than the fingers 53 and extending substantially the entire length of the inlet to the transfer passage 100 nearly to the wall 51 so as to prevent the cotton plants from being deflected into the transfer passage beyond the picker unit by the force of the air blast. It will be apparent that following the rush of a hard blast of air a venturi action causes other air to move along the edges of the transfer passage and there is a tendency for this following air to draw the growing plants into the transfer passage alongside the picker roll. This is prevented by means of the guard fingers.

As shown, the inner edges of both sets of guard fingers, that is, the edges which extend between the saws 11, are straight and may be positioned so as to pass close to the vertical rod 13 on which the saws are mounted while the outer edges which contact the plants are smoothly curved or bowed at least over a major portion of their length, the bowed portion conforming roughly to the curvature of the peripheries of the saws. The terminal portion 105 of the outer curve of each guard finger 53 intersects the straight inner portion in a point, while the terminal portion 106 of each of the guard members 55 is flattened for a short distance and is then rounded at the end, as indicated in the drawing. The individual guard fingers 53 and 55 and spacers 56 are clamped together upon the rod 103 by means of a nut 107 engaging the threaded upper end of the rod 103 so as to constitute a composite unit, the position of which may be angularly and accurately adjusted with reference to the vertical axis of the saw unit 10 by any suitable adjusting means. As shown, the adjusting means is mounted on a vertical post 108 carried upon the floor of the machine. This post is provided with a horizontal brace or arm 109 upon which is mounted an adjustable bar 110 adjustably secured to the arm 109 by bolts 111, 112 extending through the slots 113, 114 formed in the bar 110. The rear end of the bar 110 is turned up as at 115 for engagement by an adjusting screw 116 threaded to the upper portion of the post 108. To the forward end of the bar 110 opposite the turned up portion 115 is secured a vertical stop member 117 adapted to simultaneously engage all the guard fingers 53 and 55 of the guard unit to prevent them from swinging further about the central axis of the upright rod 113 in a direction toward the vertical axis of the picker unit. The position of the stop member 117 may, of course, be adjusted by means of the adjusting screw 116. The tightness with which the guard fingers are clamped to the upright rod on which they are mounted may be varied by means of the adjusting nut at the upper portion thereof.

The invention has been described in detail for the purpose of illustration, but it will be obvious that numerous modifications and variations may be resorted to without departing from the spirit of the invention.

I claim:

1. In a cotton picking machine adapted to move lengthwise along a row of cotton plants, said machine having a plant passage extending lengthwise therethrough through which plants of a row are adapted to pass as the machine is moved along the row, and having a fiber transfer passage intersecting the plant passage, a rotary toothed picker located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein the picker unit is rotated in a direction such that the picking portion thereof moves in the same direction as the plants through the plant passage.

2. A cotton picking machine as set forth in claim 1, wherein the picker unit comprises vertically spaced saws having teeth curved in the direction of rotation of the picker unit as a whole.

3. A cotton picking machine as set forth in claim 1, wherein the picking unit comprises vertically spaced saws, and guard members extending across the inlet to said transfer passage with a portion of each guard member lying between successive saws of the unit, said guard fingers serving to prevent the plants from following the air into the fiber transfer passage.

References Cited in the file of this patent

UNITED STATES PATENTS

| Number | Name | Date |
|---|---|---|
| 898,893 | Hollingsworth et al. | Sept. 15, 1908 |
| 1,760,312 | Mitchell | May 27, 1930 |
| 2,427,155 | Nisbet, Sr. | Sept. 9, 1947 |
| 2,484,524 | Nisbet, Sr. | Oct. 11, 1949 |
| 2,513,259 | Walker, Jr. | June 27, 1950 |